Figure 1:
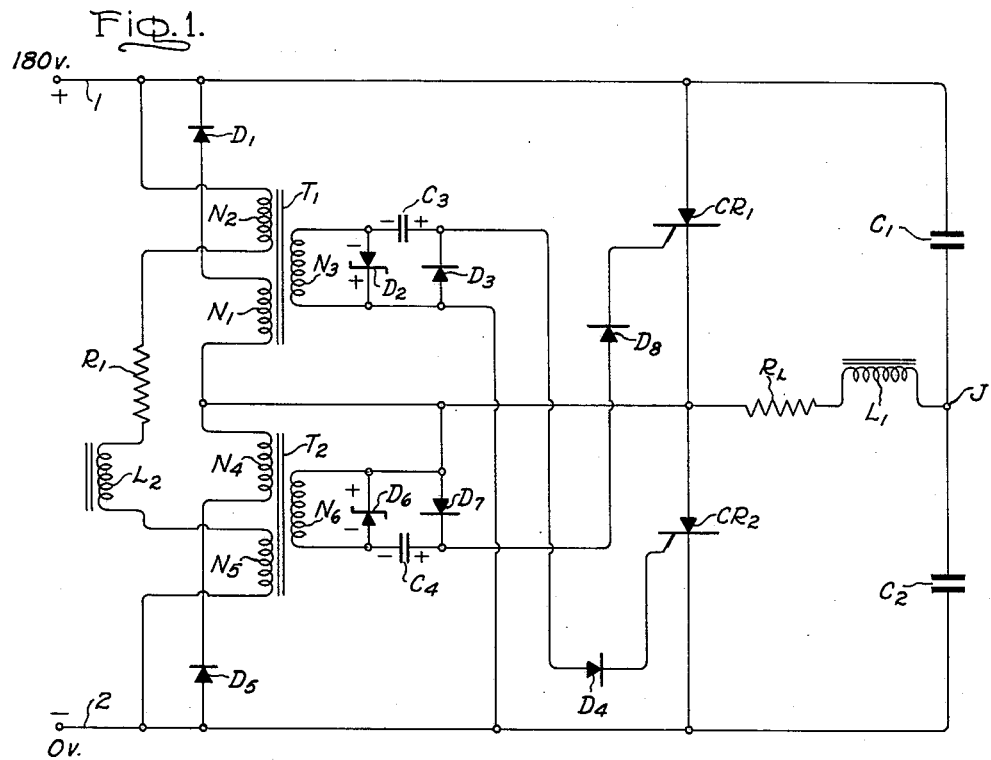

May 8, 1962 H. E. SCHULTZ 3,034,015
CONTROLLED RECTIFIER INVERTER CIRCUIT
Filed Oct. 14, 1959 2 Sheets-Sheet 2

Inventor:
Harry E. Schultz
by Ernest W. Legree
His Attorney

United States Patent Office 3,034,015
Patented May 8, 1962

3,034,015
CONTROLLED RECTIFIER INVERTER CIRCUIT
Harry E. Schultz, Euclid, Ohio, assignor to General Electric Company, a corporation of New York
Filed Oct. 14, 1959, Ser. No. 846,297
10 Claims. (Cl. 315—97)

This invention relates to controlled rectifier inverter circuits for obtaining an alternating current output from a direct current supply. It is more particularly concerned with such inverter circuits suitable for operating discharge lamps and adapted to operate from direct current at voltages conveniently achieved by rectification of the usual alternating current supplies.

Inverters using ordinary power transistors are by now relatively well-known and provide a convenient means for obtaining alternating current from a direct current supply. One such inverter circuit is described and claimed in my copending application Serial No. 783,337, filed December 29, 1958, now U.S. Patent No. 2,971,126, entitled "Transistor Inverter Circuits," and assigned to the same assignee as the present invention. It uses a current transformer connected in series with the load to feed back current bias to the transistors to maintain oscillations at the natural resonant frequency of the load circuit. This circuit is intended particularly for operation from low voltage D.C. supplies, v.g., 12 to 24 volts, and has already found substantial application in fluorescent lighting of public transportation vehicles and buses.

Transistors, at least as developed to date, are essentially low-voltage devices and the above-mentioned transistor inverter circuit cannot conveniently be adapted to operate at higher direct voltages, for instance D.C. voltages in the range of 110 volts commercially available in some localities, or higher D.C. voltages achieved by rectification of single phase or three phase commercial A.C. supplies. It will readily be appreciated that reducing and rectifying a 120-volt A.C. supply to 12 to 24 volts D.C. in order to operate a transistor inverter which in turn raises the voltage to several hundred volts A.C. (at a higher frequency such as 3000 c.p.s.) to operate fluorescent lamps is not attractive from an efficiency point of view.

The semi-conductive controlled rectifier devices which have recently been made available, for instance the silicon controlled rectifier, can operate at much higher direct voltages than ordinary transistors. This device has characteristics somewhat similar to those of a gas thyratron tube and has emitter and collector electrodes similar to the cathode and anode of the thyratron and a gate electrode similar to the control electrode or grid of the thyratron. However the silicon controlled rectifier has a forward voltage drop which may be only one-tenth that in a thyratron and a deionization time which is considerably less. The lower forward voltage drop allows the device to pass a high current with less loss and the short deionization time permits the device to be turned on and off at a higher rate than would a thyratron tube.

Accordingly the object of the invention is to provide a controlled rectifier power inverter for producing an alternating current output from a direct current supply and which is characterized by its relatively high efficiency and reliability of operation.

A more specific object of the invention is to provide a controlled rectifier inverter circuit particularly adapted for energization through rectification of the usual commercial A.C. supply and suitable for operating a discharge lamp load at relatively high efficiency and with good stability.

Other objects and advantages of the present invention will become apparent from the following description thereof as developed in connection with the detailed description of embodiments illustrating its principles. The features of the invention believed to be novel will be more particularly pointed out in the appended claims.

Figure 2:
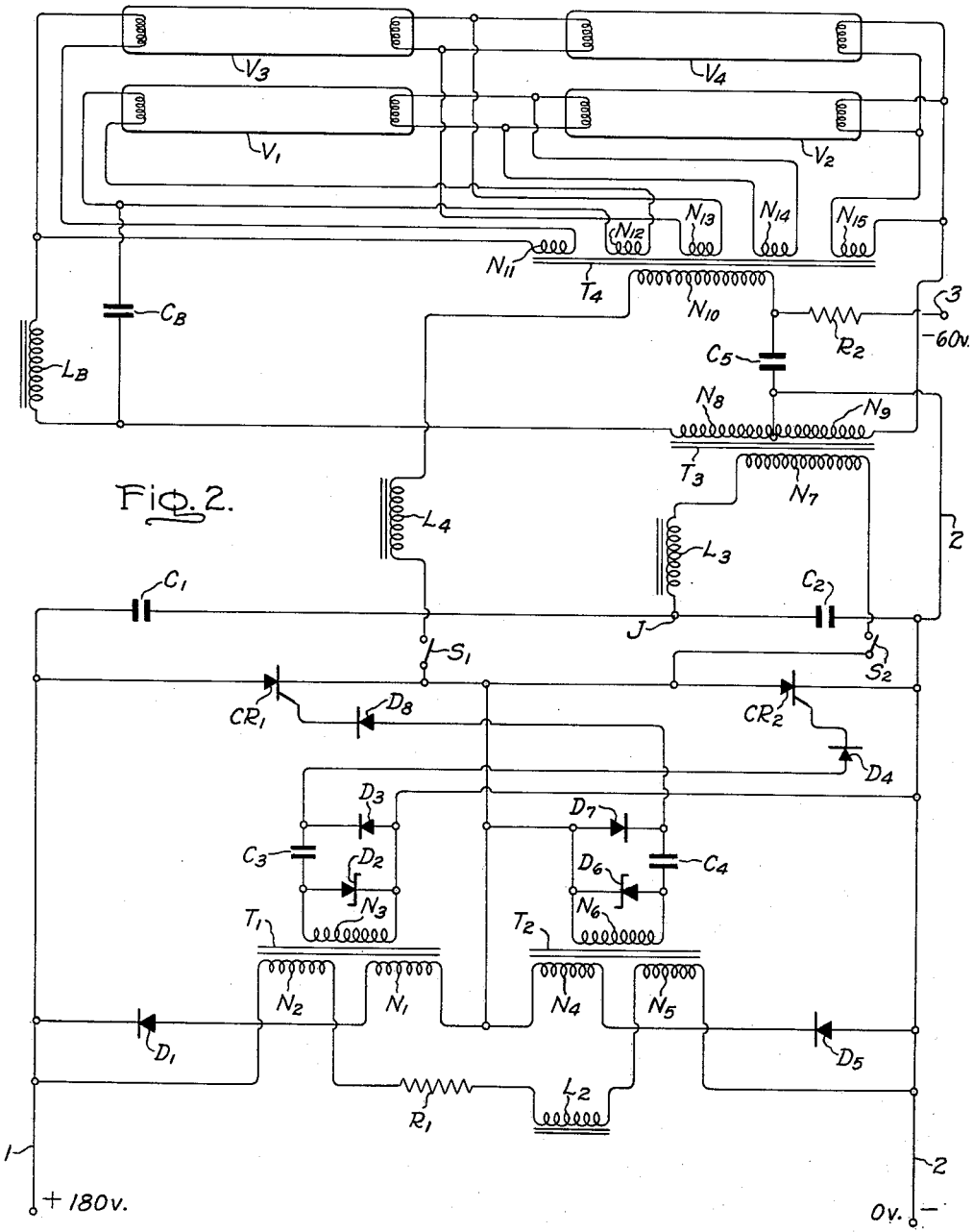

In the drawings:
FIG. 1 is a schematic circuit diagram of a controlled rectifier inverter circuit in accordance with the present invention.
FIG. 2 is a schematic diagram illustrating a complete silicon controlled rectifier system supplying a fluorescent lamp load of the kind utilizing electrode preheat.

In accordance with the invention, the load circuit has associated with it inductance and capacitance whereby to form an oscillatory circuit having a Q, that is a ratio of inductive reactance to resistance, greater than unity and preferably in the range of 1.5 to 2. The load circuit is fed through a pair of controlled rectifiers alternately from opposite sides of the direct current supply. By reason of the oscillatory nature of the circuit, the capacitance in the load circuit is charged beyond the level of the D.C. supply at the instant when current through that controlled rectifier which had been conducting drops to zero and allows that controlled rectifier to turn off. At this instant the other controlled rectifier is not yet turned on. The excess of charge in the capacitance is supplied to a trigger circuit which, by means of a saturating transformer preferably having a core of rectangular hysteresis characteristic material produces a trigger pulse at the gate of the other controlled rectifier to turn it on after a predetermined time delay. This initiates the second half cycle of conduction at the end of which the trigger circuit is brought into play again to turn on the first controlled rectifier, again after a predetermined time delay, and start the operation over again for the second cycle of the circuit.

In the inverter circuits illustrated in the drawings, like reference numbers designate corresponding elements in both figures. In FIG. 1, the direct current supply may conveniently be of approximately 160 to 180 volts which is applied to terminals or conductors 1, 2 with the polarity indicated. The semi-conductive controlled rectifiers designated generally CR in the drawings may suitably be silicon controlled rectifiers wherein the arrow represents the anode, the transverse bar the cathode, and the oblique connection represents the gate or control electrode.

The resistive or power consuming portion of the load is represented by $R_L$. This may, if desired, be a discharge lamp load including reactive ballasting elements such as inductances or high leakage reactance transformers and capacitances for limiting or regulating the current through the lamp. An inductance $L_1$ is connected in series with $R_L$ but this may be eliminated in part or in whole if the over-all reactance of the lamp load circuit proper including the ballast is inductive. The series combination of $R_L$, $L_1$, and $C_2$ form an oscillatory circuit with a Q greater than unity and preferably in the range of 1.5 to 2. It will be observed that the controlled rectifiers $CR_1$ and $CR_2$, by alternate triggering, allow conduction from one side or the other of the D.C. supply through the load circuit.

The operation of the circuit may be described as follows. Assuming that at a given moment controlled rectifier $CR_1$ is conducting, current will flow from the positive side of the D.C. supply (line 1), through $CR_1$, load $R_L$, inductance $L_1$, and cause capacitor $C_2$ to charge up positively (at the same time discharging any accumulated negative charge on capacitor $C_1$). Due to the oscillatory nature of the circuit, the charging current is in the nature of a damped sinusoid and at the instant when the current through controlled rectifier $CR_1$ has passed through the maximum and is approaching zero, the charge on capacitor $C_2$ exceeds the source voltage. In other words, the voltage at the junction J of capacitors $C_2$ and $C_1$ at this instant is more positive than the positive D.C. line 1. Of course current through controlled rectifier $CR_1$ cannot reverse and almost as soon as the current in the positive direction has reverted to zero, controlled rectifier $CR_1$ goes to a high impedance non-conducting state.

The trigger circuit now comes into play and is energized by the excess positive charge over the level of the D.C. supply which has been stored in capacitors $C_1$ and $C_2$. This excess charge now begins to discharge through winding $N_1$ of transformer $T_1$ and diode $D_1$ which is poled for conduction into the positive D.C. line 1. The core of transformer $T_1$, and likewise that of transformer $T_2$ which is in all respects similar, consists of high permeability ferrite material having a rectangular hysteresis characteristic. As a result, the windings on transformers $T_1$ and $T_2$ have a high non-saturated inductive reactance and a low saturated inductive reactance, with a very abrupt transition between non-saturation and saturation. Transformers $T_1$ and $T_2$ are provided with magnetizing windings $N_2$ and $N_5$ respectively which are connected in series with each other and with resistance $R_1$ and inductance $L_2$ across the D.C. supply. The current through this circuit, which may be considered a D.C. reset current, normally holds the cores of transformers $T_1$ and $T_2$ at the negative saturation level. The value of the D.C. reset current may be adjusted by selection of resistance $R_1$. The purpose of inductance $L_2$ is to prevent dissipation of pulse energy by transformer action in this auxiliary circuit.

The discharge current from capacitors $C_1$ and $C_2$ through winding $N_1$ of transformer $T_1$ produces a magnetizing force in opposition to that produced by the D.C. reset current through magnetizing winding $N_2$ which causes the core of the transformer to become unsaturated. The transformer thereupon acts as a current transformer to force current through zener diode $D_2$. A zener diode is a semi-conductor device which has the property of passing current in the reverse direction with a substantially constant voltage drop after a certain voltage level, commonly known as the zener level or breakdown point, is attained. As a result, a constant voltage is maintained across zener diode $D_2$ with the polarity indicated as long as the core of transformer $T_1$ is unsaturated. Trigger storage capacitor $C_3$ charges through diode $D_3$ to the voltage across the zener diode, that is, to the zener level, with the polarity indicated. The turns of windings $N_3$, the core cross section of transformer $T_1$, the saturation flux density, and the zener level are proportioned such that the core saturates in the positive direction at the end of a predetermined time delay after current starts to flow through winding $N_2$. The core of transformer $T_1$ having now saturated in a positive direction, the voltage generated across winding $N_3$ drops to zero and trigger storage capacitor $C_3$ discharges through diode $D_4$, the gate circuit of controlled rectifier $CR_2$ and winding $N_3$. This pulse turns on controlled rectifier $CR_2$ and starts current flowing from the positive side of the D.C. supply and through the load circuit in the reverse direction, thus initiating the second half cycle of operation. As soon as controlled rectifier $CR_2$ is turned on, all current flow from capacitors $C_1$ and $C_2$ is diverted through it. As a result, current flow through winding $N_1$ of transformer $T_1$ ceases, and the core of transformer $T_1$ returns to the negative saturation level by the D.C. reset current flowing through winding $N_2$.

During the second half cycle, current flow is through controlled rectifier $CR_2$ and causes the junction J of capacitors $C_1$ and $C_2$ to charge up negatively. At the end of the second half cycle, when current again approaches zero, the junction of capacitors $C_1$ and $C_2$ is charged to a higher negative value than the negative side of the D.C. supply (line 2). At this instant controlled rectifier $CR_2$ turns off and all conduction through the controlled rectifiers ceases. The excess negative charge on capacitors $C_1$ and $C_2$ then begins to discharge through the primary winding $N_4$ of transformer $T_2$ and diode $D_5$. This transformer functions with zener diode $D_6$ in the same manner as transformer $T_1$ to charge up trigger storage capacitor $C_4$ through diode $D_7$ and supply a delayed firing pulse to the gate electrode of controlled rectifier $CR_1$ through the network of diode $D_8$ and winding $N_6$. This initiates the next half cycle, that is the first half cycle of the second cycle, and at the end thereof, the entire cycle starts over at the point where the description of the operation was begun.

The use of two load circuit capacitors $C_1$, $C_2$ assures current flow from the D.C. line on both half cycles. However the circuit will operate with only one of capacitors $C_1$ and $C_2$, but in such case current flow from the D.C. line will occur on alternate half cycles only. The energy supplied to the load circuit during the half cycles of no line current flow will come from the charged capacitor.

The trigger circuit delays the turning on of the "off" controlled rectifier sufficiently long to allow the previously "on" controlled rectifier to recover, that is for its gate electrode to regain control after the forward current has been interrupted. If this were not done, both controlled rectifiers might go on at once, resulting in a dead short circuit through them across the D.C. line. The recovery time of the controlled rectifiers may be about 5 microseconds, and the delay provided by the trigger circuit may be about 30 microseconds to provide a good margin of safety.

A feature of the trigger circuit is the use of zener diodes to stabilize the hold-off or delay time by providing a constant charging rate to the trigger storage capacitor. Inasmuch as the breakdown voltage of the zener diode is essentially constant, the charging rate into the trigger storage capacitor remains substantially constant despite variations in circuit load. As a result, the saturation-to-reverse-saturation time, that is, the time required to cause the core of transformer $T_1$ to pass from saturation in one direction, through non-saturation, to saturation in the opposite direction remains substantially constant, thereby stabilizing output, frequency, and over-all performance. However if less stability suffices, a resistor may be connected in place of the zener diode. The other diodes associated with the trigger circuit provide one-way charging or discharging paths as the case may be. In practice, transformers $T_1$ and $T_2$ are small toroidal core units less than an inch in diameter.

The circuit of FIG. 1 is suitable for operating discharge lamps, particularly instant-start type fluorescent lamps which do not require electrode preheat. For such use, the high reactance transformer which regulates the current through the lamps is connected into the inverter circuit in lieu of resistance $R_L$. If the over-all ballast combination has a relatively high power factor, $L_1$ is maintained in the circuit. If the ballast combination has a low lagging power factor, $L_1$ may be eliminated, or reduced in inductance.

Referring to FIG. 2, a circuit generally similar to that of FIG. 1 is illustrated and which is adapted to operate discharge lamps $V_1$ to $V_4$. These lamps may be fluorescent lamps of the kind utilizing electrodes which are supplied with preheat current at starting and also during operation. All the lamps are energized as regards discharge current by a main load circuit comprising transformer $T_3$ having a primary winding $N_7$ and a pair of secondary windings $N_8$ and $N_9$ which are connected in series, their junction point forming a center tap which is connected to the negative D.C. line 2 which may be considered ground. The lamps $V_1$ to $V_4$ are connected in series pairs, the first pair $V_1$ and $V_2$ being connected in a leading circuit across the secondary windings of transformers $T_3$ in series with ballasting capacitor $C_B$, and the other pair $V_3$ and $V_4$ being connected in a lagging circuit in series with ballasting inductance $L_B$. The lamps are preheated by an auxiliary load circuit comprising transformer $T_4$ whose primary winding $N_{10}$ is connected to negative or ground line 2 of the D.C. supply through capacitor $C_5$. The junction of winding $N_{10}$ and capacitor $C_5$ is connected through resistor $R_2$ to a terminal 3 to which is applied —60 volts D.C. relative to negative or ground line 2. The various secondary windings $N_{11}$ to $N_{15}$ of transformer $T_4$ are connected across the filamentary cathodes of the lamps.

The inverter circuit is turned on, that is connected to the D.C. supply, with switches $S_1$ and $S_2$ open. With respect to the negative or ground line 2, +180 volts may be applied to the positive line 1 and —60 volts may be applied to terminal 3 so that capacitor $C_5$ charges to —60 volts. Switch $S_1$ is then closed to turn on the preheating circuit through inductance $L_4$. Capacitor $C_5$ discharges through the circuit of winding $N_4$ of transformer $T_2$ and diode $D_5$ to produce a delayed firing pulse to the gate of controlled rectifier $CR_1$, in the same fashion as previously described with reference to the circuit of FIG. 1. This pulse turns on controlled rectifier $CR_1$, thereby applying the full D.C. line voltage to the preheat circuit. At the same time, the discharge current from capacitor $C_5$ which had been flowing through diode $D_5$ is now shunted, allowing the core of transformer $T_2$ to be reset to the negative saturation level by the D.C. reset circuit.

The inverter circuit now oscillates in similar fashion as previously described with reference to the circuit of FIG. 1, but at the natural resonant frequency of the preheat circuit. This frequency is determined by inductance $L_4$, the load reflected into the primary $N_{10}$ of transformer $T_4$, and capacitor $C_5$. At the end of each half cycle, capacitor $C_5$ is charged to a voltage greater than the line voltage, and its discharge through either the circuit of diode $D_1$ or that of diode $D_5$ produces a delayed pulse to turn on the controlled rectifier unit that had been in the off state. The delay between the time when the formerly conducting controlled rectifier goes to high impedance and the turning on of the previously off controlled rectifier allows the previously on controlled rectifier to recover its hold-off voltage.

The connection of capacitor $C_5$ through current limiting resistor $R_2$ across a —60 volt source is for the purpose of providing an initial charge across $C_5$ which can discharge through the trigger circuit when switch $S_1$ is closed. This starts the oscillations and thereafter the —60 volt connection serves no further purpose and is not necessary to maintain oscillations. Of course other ways of starting the oscillations can readily be devised, and will consist in general of some means for initially turning on one of the controlled rectifiers. For instance an auxiliary circuit may be used to provide an initial pulse to one of the controlled rectifiers. Another suitable arrangement using $C_5$ as presently connected but without $R_2$ and its connection to a —60 volt source, would be to provide a switch allowing $C_5$ to be disconnected, charged to a negative potential, and then reconnected into the circuit. Upon closing $S_1$, the stored negative charge on $C_5$ would then energize the trigger circuit to turn on controlled rectifier $CR_1$.

After a few seconds (5 to 10), switch $S_2$ is closed and the lamps are started and discharge current supplied to them through transformer $T_3$. Winding $N_7$ of transformer $T_3$ is energized alternatively by controlled rectifiers $CR_1$ and $CR_2$ through inductance $L_3$ and capacitors $C_1$ and $C_2$ in similar fashion as previously described with reference to the circuit of FIG. 1. Since the current through the circuit including $L_3$ and $T_3$ which provides discharge current through the lamps is much greater than that through $L_4$ and $T_4$ energizing the preheat circuits, the inverter then runs at substantially the natural resonant frequency of the main discharge circuit.

In a combination according to FIG. 2 actually constructed and tested and operating four 96-inch multiple Power Groove lamps of 200 watts rating each for a total load of about 800 watts at about 900 cycles from a 180 volt D.C. supply, the following are the constants of the principal circuit components used. They are listed herein by way of example and not in order to limit the invention thereto:

Controlled rectifiers, $CR_1$, $CR_2$ _____ ZJ 39A-200 silicon controlled rectifiers (International Rectifier Corp.).
Diodes $D_1$, $D_6$ _____ 1N538 diodes (R.T.M.A.).
Diodes $D_3$, $D_4$, $D_7$, $D_8$ _____ 1N75 diodes (R.T.M.A.).
Diodes $D_2$, $D_6$ _____ 1N758 zener diodes—10 volt breakdown (Texas Instrument Co.).
Transformers $T_1$, $T_2$ _____ Toroidal core of ferrite material (RO3 by Allen Bradley Co.). O.D.=0.625″, I.D.=0.353″, height=0.125″, turns ratio: $N_1 : N_2 : N_3 = N_4 : N_5 : N_6 = 25 : 100 : 45$.
Transformer $T_3$ _____ Input: 70.5 volts. Output: 480 volts, 1.72 amps.
Transformer $T_4$ _____ Input: 70.5 volts. Output: 3.7 volts to each cathode.
Lamps:
  $V_1$, $V_2$ _____ Lead lamps: V=245 volts across pair. I=1.59 amps.
  $V_3$, $V_4$ _____ Lag lamps: V=246 volts across pair. I=1.53 amps.
Capacitors:
  $C_1$, $C_2$ _____ 4.62 microfarads.
  $C_3$, $C_4$ _____ 0.01 microfarad.
  $C_5$ _____ 0.11 microfarad.
  $C_B$ _____ 0.65 microfarad.
Inductors:
  $L_2$ _____ 100 millihenries.
  $L_3$ _____ 2.7 millihenries.
  $L_4$ _____ 30 millihenries.
  $L_B$ _____ 42 millihenries.
Resistors:
  $R_1$ _____ 12 kilohms.
  $R_2$ _____ 100 kilohms.

It will be understood that the specific circuits which have been described herein are intended as exemplary and not as limitative of the invention. Likewise whereas the invention has been described using silicon controlled rectifiers, other types of controlled rectifiers including gaseous thyratrons may be used with appropriate modifications of the source potential and the circuit elements. The appended claims are therefore intended to cover any such modifications coming within the true spirit and scope of the invention.

What I claim as new and desire to secure by Letters Patent of the United States is:

1. An inverter circuit comprising a direct current source, a pair of controlled rectifiers, a load circuit comprising a resistive load proper and including inductance and capacitance combined therewith rendering said load circuit resonant at a selected frequency of operation, connections from opposite sides of said source through the main rectifying paths of said controlled rectifiers to said load circuit for energizing it with half cycles of conduction in opposite polarity and achieving at the end of each half cycle a charge potential on said included capacitance exceeding the source potential, a trigger circuit, means connecting said included capacitance to said trigger circuit whereby said trigger circuit is made responsive to the excess of charge on said included capacitance, and means connecting said trigger circuit to the previously non-conducting one of said controlled rectifiers for turning on the nonconducting rectifier after a predetermined delay.

2. An inverter circuit comprising a direct current source, a pair of controlled rectifiers, a load circuit comprising a resistive load proper and including inductance and capacitance combined therewith rendering said load circuit series resonant with a Q between approximately 1.5 and 2 at a selected frequency of operation, connections from opposite sides of said source through the main rectifying paths of said controlled rectifiers to said load circuit for energizing it with half cycles of conduction of opposite polarity and achieving at the end of each half cycle a charge potential on said included capacitance exceeding the source potential, a trigger circuit, means connecting said trigger circuit to said included capacitance whereby said trigger circuit is made responsive to the excess of charge on said included capacitance, and means connecting said trigger circuit to the previously non-conducting one of said controlled rectifiers for turning on the nonconducting rectifier after a predetermined delay sufficient to allow the previously conducting one of said controlled rectifiers to recover.

3. An inverter circuit comprising a direct current source, a pair of controlled rectifiers each having anode, cathode and gate electrodes, a load circuit comprising a resistive load proper and including inductance and capacitance combined therewith rendering said load circuit resonant at a selected frequency of operation, connections from opposite sides of said source through the anode-cathode electrode paths of said controlled rectifiers to said load circuit for energizing it with half cycles of conduction in opposite polarity and achieving at the end of each half cycle a charge potential on said included capacitance exceeding the source potential, a trigger circuit, means connecting said trigger circuit to said included capacitance whereby said trigger circuit is made responsive to the excess of charge on said included capacitance and means connecting said trigger circuit to the gate electrode of the previously non-conducting one of said controlled rectifiers to provide a delayed pulse to the nonconductive rectifier and to turn it on at the end of a predetermined delay after cessation of current flow through the other controlled rectifier.

4. An inverter circuit comprising a direct current source, a pair of controlled rectifiers each having anode, cathode and gate electrodes, a load circuit comprising a resistive load proper and including inductance, opposite sides of said source being connected through the anode-cathode electrode paths of said controlled rectifiers to one side of said load circuit, and a pair of capacitors connected between the other side of said load circuit and opposite sides of said source, said load circuit and capacitors being series resonant at a selected frequency of operation so that when said load circuit is energized through said controlled rectifiers with half cycles of conduction in alternating polarity, a charge potential which exceeds the source potential is achieved on said capacitor upon cessation of current flow through each controlled rectifier, a trigger circuit, and means connecting said capacitance to said trigger circuit whereby said trigger circuit is made responsive to the excess of charge on said capacitors at the end of each half cycle, and means connecting said trigger circuit to the gate electrode of the previously non-conducting one of said controlled rectifiers to provide a delayed pulse to the nonconducting rectifier to turn it on at the end of a predetermined delay after cessation of current flow through the other controlled rectifier.

5. An inverter circuit comprising a direct current source, a pair of controlled rectifiers, a load circuit comprising a resistive load proper and including inductance and capacitance combined therewith rendering said load circuit resonant at a selected frequency of operation, connections from opposite sides of said source through the main rectifying paths of said controlled rectifiers to said load circuit for energizing it with half cycles of conduction in opposite polarity and achieving at the end of each half cycle a charge potential on said included capacitance exceeding the source potential, and a trigger circuit comprising a transformer having a saturable core, means normally maintaining said core saturated, one winding connected to said included capacitance and discharging the excess charge on said included capacitance, another winding providing a delayed triggering signal, and conductor means applying said triggering signal to the previously non-conducting one of said controlled rectifiers for turning on the non-conducting rectifier after a predetermined delay.

6. An inverter circuit comprising a direct current source, a pair of controlled rectifiers, a load circuit comprising a resistive load proper and including inductance and capacitance combined therewith rendering said load circuit resonant at a selected frequency of operation, connections from opposite sides of said source through the main rectifying paths of said controlled rectifiers to said load circuit for energizing it with half cycles of conduction in opposite polarity and achieving at the end of each half cycle a charge potential on said included capacitance exceeding the source potential, and a trigger circuit comprising a saturable core transformer having one magnetizing winding included in a reset circuit for normally maintaining said core saturated in one direction, a second winding included in a rectifying circuit and connected to said included capacitance for discharging the excess charge on said included capacitance in order to unsaturate said core and saturate it in the reverse direction, a third winding providing a delayed triggering signal, and conductor means for applying said triggering signal to the previously non-conducting one of said controlled rectifiers for turning it on after a predetermined delay.

7. An inverter circuit comprising a direct current source, a pair of controlled rectifiers, a load circuit comprising a resistive load proper and including inductance, opposite sides of said source being connected through said controlled rectifiers to one side of said load circuit, and at least one capacitor connected between the other side of said load circuit and one side of said source, said load circuit and capacitor being resonant at a selected frequency of operation so that when said load circuit is energized through said controlled rectifiers with half cycles of conduction in alternating polarity, a charge potential which exceeds the source potential is achieved on said capacitor upon cessation of current flow through each controlled rectifier, and a trigger circuit comprising a pair of transformers each having a saturable core, means normally maintaining said cores saturated in one direction, a winding in each transformer included in a rectifying circuit for discharging the excess charge on said capacitor in order to unsaturate the core and saturate it in the reverse direction, and another winding in each transformer having a zener diode and a trigger storage capacitor connected thereacross for charging at a constant rate and stabilizing the saturation-to-reverse-saturation time of said core, and means coupling said saturating transformers to said controlled rectifiers to provide triggering signals thereto.

8. An inverter circuit comprising a direct current source, a pair of controlled rectifiers each having anode, cathode and gate electrodes, a load circuit comprising a resistive load proper and including inductance, opposite sides of said source being connected through the anode-cathode electrode paths of said controlled rectifiers to one side of said load circuit, and a pair of capacitors connected between the other side of said load circuit and opposite sides of said source, said load circuit and capacitors being series resonant at a selected frequency of operation so that when said load circuit is energized through said controlled rectifiers with half cycles of conduction in alternating polarity, a charge potential which exceeds the source potential is achieved on said capacitors upon cessation of current flow through each controlled rectifier, and a trigger circuit comprising a pair of saturating transformers each having a core of rectangular hysteresis characteristic material, one magnetizing winding included in a reset circuit for normally maintaining said core saturated in one direction, a second winding included in a rectifying circuit for discharging the excess charge on said capacitors in order to unsaturate said core and saturate it in the reverse direction, and a third winding having a zener diode and a trigger storage capacitor connected thereacross for charging at a constant rate and stabilizing the saturation-to-reverse-saturation time of said core, and a pair of rectifying circuits connecting each trigger storage capacitor to the gate electrode of one of said controlled rectifiers in order to turn on each controlled rectifier at the end of a predetermined delay after cessation of current flow through the other controlled rectifier.

9. A discharge lamp inverter operating circuit comprising a direct current source, a pair of controlled rectifiers, a load circuit including transforming means energizing a grouping of discharge lamps alternately inductively and capacitively ballasted, said load circuit including inductance and a series capacitance rendering said load circuit resonant with a Q between approximately 1.5 and 2 at a selected frequency of operation, connections from opposite sides of said source through the main rectifying paths of said controlled rectifiers to said load circuit for energizing it with half cycles of conduction in opposite polarity and achieving at the end of each half cycle a charge potential on said included capacitance exceeding the source potential, a trigger circuit, means connecting said included capacitance to said trigger circuit whereby said trigger circuit is made responsive to the excess of charge on said included capacitance, and means connecting said trigger circuit to the previously non-conducting one of said controlled rectifiers for turning on the nonconducting rectifier after a predetermined delay.

10. An inverter circuit for operating discharge lamps of the type having preheatable electrodes comprising a direct current source, a pair of controlled rectifiers, a main load circuit comprising transforming means providing discharge current to a grouping of discharge lamps and including inductance, an auxiliary load circuit comprising transforming means supplying electrode preheat current to said lamps and including inductance, opposite sides of said source being connected through the main rectifying paths of said controlled rectifiers to one side of said load circuits, a pair of capacitors connected between the other side of said main load circuit and opposite sides of said source, at least one capacitor connected between the other side of said auxiliary load circuit and one side of said source, said load circuits and their respective capacitances being resonant at selected frequencies of operation so that when said load circuits are energized through said controlled rectifiers with half cycles of conduction in opposite polarity, charge potentials which exceed the source potential are achieved on said capacitors, a trigger circuit, means connecting said included capacitance to said trigger circuit whereby said trigger circuit is made responsive to the excess of charge on said capacitors at the end of each half cycle, and means connecting said trigger circuit to the previously non-conducting one of said controlled rectifiers for turning on the nonconducting rectifier at the end of a predetermined delay after cessation of current flow through the other controlled rectifier.

References Cited in the file of this patent

UNITED STATES PATENTS

| | | |
|---|---|---|
| 2,426,964 | Callender | Sept. 2, 1947 |
| 2,920,240 | Macklem | Jan. 5, 1960 |
| 2,923,856 | Greene | Feb. 2, 1960 |
| 2,924,750 | Mulder | Feb. 9, 1960 |